US007254406B2

United States Patent
Beros et al.

(10) Patent No.: US 7,254,406 B2
(45) Date of Patent: Aug. 7, 2007

(54) METHOD AND APPARATUS FOR EFFECTING A DETECTION OF MOBILE DEVICES THAT ARE PROXIMATE AND EXHIBIT COMMONALITIES BETWEEN SPECIFIC DATA SETS, OR PROFILES, ASSOCIATED WITH THE PERSONS TRANSPORTING THE MOBILE DEVICES

(76) Inventors: Suman Beros, 113 Lucas La., Bethesda, MD (US) 20814; Marian K. Riedy, 4613 43rd St., NW., Washington, DC (US) 20016

( * ) Notice: Subject to any disclaimer, the term of this patent is extended or adjusted under 35 U.S.C. 154(b) by 420 days.

(21) Appl. No.: 10/459,181

(22) Filed: Jun. 10, 2003

(65) Prior Publication Data

US 2004/0009750 A1 Jan. 15, 2004

Related U.S. Application Data

(60) Provisional application No. 60/387,482, filed on Jun. 10, 2002.

(51) Int. Cl.
*H04Q 7/20* (2006.01)
(52) U.S. Cl. .................. 455/456.3; 455/41.2; 455/440; 455/456.1

(58) Field of Classification Search ............... 455/41.2, 455/41.3, 67.11, 435.2, 440, 450, 456.1, 464, 455/456.2, 518, 456.3, 519, 414.1, 414.2, 455/432.3
See application file for complete search history.

(56) References Cited

U.S. PATENT DOCUMENTS

| 6,549,768 B1* | 4/2003 | Fraccaroli ................ 455/456.3 |
| 6,735,430 B1* | 5/2004 | Farley et al. ............. 455/414.1 |
| 2004/0014486 A1* | 1/2004 | Carlton et al. ........... 455/550.1 |
| 2005/0073991 A1* | 4/2005 | Roberts et al. ............. 370/350 |

* cited by examiner

*Primary Examiner*—Nay Maung
*Assistant Examiner*—Tuan H. Nguyen

(57) ABSTRACT

The invention disclosed is a method and apparatus for effecting a detection of selected proximate mobile devices using short-range radio frequency communications and/or Bluetooth and/or geo positioning systems, which detection and selection are based on the comparison and evaluation of pre-determined profiles associated with the persons transporting the mobile devices which data sets are stored and maintained in a separate central database. The invention disclosed is also a method and apparatus for effecting information exchange between mobile devices thus detected.

2 Claims, 3 Drawing Sheets

METHOD AND APPARATUS FOR EFFECTING A DETECTION OF MOBILE DEVICES THAT ARE PROXIMATE AND EXHIBIT COMMONALITIES BETWEEN SPECIFIC DATA SETS, OR PROFILES, ASSOCIATED WITH THE PERSONS TRANSPORTING THE MOBILE DEVICES

CROSS-REFERENCES TO RELATED APPLICATIONS

This application claims the benefit of U.S. Provisional Application No. 60/387,482 filed Jun. 10, 2002.

STATEMENT REGARDING FEDERALLY SPONSORED RESEARCH OR DEVELOPMENT

Not Applicable.

REFERENCE TO A SEQUENTIAL LISTING

Not Applicable.

BACKGROUND OF THE INVENTION

According to the 2000 Report of the Bureau of the Census, there are 88 Million Americans over the age of twenty without a spouse. By some estimates, as many as 30 Million of these singles are actively looking for mates. Market research of singles in the age group between 20 and 55 returns a unanimous result: all were interested in finding a romantic relationship. The only question was how.

Matchmaking services abound, ranging from individual matchmakers to personal ads and on-line dating. On-line dating has quickly become popular because of its convenience and efficiency: subscribers can quickly scan hundreds of potential mates from the comfort of home. But the fact is that on-line matchmaking is not particularly effective. One of the main reasons for the low success rate is that on-line "dating" fails to account for a basic fact about human nature: physical attraction is the sine qua non of a romantic relationship. The psychologists who have studied dating and matchmaking confirm that the physical attraction must come first; all else is secondary. A month of e-mailing through an on-line dating service is all for naught if there is no spark during the first real-life meeting.

The better paradigm is meet first, then decide. That is why "singles' events" remain popular. But they are also inconvenient and time-consuming. What singles need is an easy way to find out that another person in the neighborhood is looking for someone just like them, or that another person across the street is just what they are looking for.

Last year nearly 110 Million people in the U.S. used a cell phone. Wireless phones have become a staple of American life. Americans still use their cell phones largely for voice transmission, but the phones are capable of various modes of data transmission that offer valuable additional functionality.

One of these modes is Bluetooth. Bluetooth is an open specification that enables short-range, unregulated radio frequency spread spectrum wireless connections between Bluetooth-enabled devices such as desktop and laptop computers, personal digital assistants, cell phones, printers and scanners, and others. It operates in the 2.4 GHz Industrial, Scientific, and Medical (ISM) band with a range of either 10 or 100 meters, though the Bluetooth chips utilized in devices for the consumer market today typically have the lower range of 10 meters. It supports up to 8 devices in a piconet, has built-in security, non line-of-sight transmission, and is omni-directional.

Bluetooth-enabled consumer devices are becoming relatively common. The newest generation of cellular phones, such as the Sony Ericsson T-68, are equipped with Bluetooth chips. Motorola also sells Bluetooth cell phones. IBM's ThinkPad laptops are Bluetooth-enabled, as are Hewlett Packard's updated printers and Pocket PC handhelds. Palm, Inc. offers its latest organizer, Tungsten, with built-in Bluetooth. Microsoft has adopted Bluetooth software; it released to computer manufacturers an update that adds Bluetooth support to its Windows XP. It also markets wireless Bluetooth keyboards and mice. Apple Computer preceded Microsoft in adding Bluetooth technology to its operating system. Based on "Microsoft's muscle" and the power of these other major players in the consumer market, it is estimated that shipments of Bluetooth-enabled devices will total 48 Million this year, and that number may climb to 1.4 Billion by 2005.

There is a need for a method and apparatus whereby a user of a mobile device equipped with Bluetooth can be made aware of the proximity of another individual searching for a match.

(1) Field of the Invention

The present invention relates to wireless communications. More particularly, the present invention pertains to a method and apparatus for effecting a detection of selected proximate mobile devices using short-range radio frequency communications and/or geo positioning systems, which selection is based on the comparison and evaluation of a pre-determined data sets, or profiles, associated with the persons transporting the mobile devices which data sets, or profiles, are stored and maintained in a separate central database. The invention disclosed is also a method and apparatus for effecting information exchange between mobile devices thus detected.

(2) Description of the Related Art

Existing methods of mobile matchmaking use proprietary technology platforms running on cellular phones which platforms utilize data supplied by wireless carriers to determine the approximate location of the phones. None of the existing technology platforms has the capacity to detect only those matches that are within a 10-meter sphere. Instead, their specificity is generally within a cell tower coverage area, which ranges in size from several miles to several city blocks.

The invention disclosed has the advantage of detecting matches only when they are within eyesight of each others, thus enabling the potential mates to determine immediately whether or not they are physically attracted to each other.

The invention disclosed has a further advantage over existing methods in that it does not depend upon location information provided by wireless carriers.

BRIEF SUMMARY OF THE INVENTION

Accordingly, the invention disclosed is a method and apparatus for effecting a detection of mobile devices proximate to another mobile device using short-range radio frequency communications and/or geo positioning systems and based on the comparison and evaluation of a pre-determined data set associated with a person transporting a mobile device for which data set detection is sought, which data sets are stored and maintained in a separate central database. The invention disclosed is also a method and apparatus for: effecting an instantaneous notification to a mobile device or devices that a detection has occurred; effecting a notification to a mobile device or devices that a detection occurred at a specified time; effecting a notification to a mobile device that another mobile device(s) was attempting to access the data set associated with the notified device; effecting an instantaneous voice and/or data connection between thus detected mobile devices; effecting the recordation of the unique identifier of a detected mobile device; effecting access to the data set associated with the unique identification number of a mobile device; effecting access to all data sets to which disclosure has been authorized; and effecting billing and collection of user fees from users of commercial services based on the disclosed invention in a time based subscription mode and/or per transaction mode.

Mobile devices comprise any and all mobile computing and communication devices including but not limited to mobile telephones, handheld organizers, portable information devices, and other mobile computing devices.

Pre-determined data sets associated with persons transporting mobile devices are collections of data provided and maintained by the registered owner or user of such mobile device stored and maintained in a separate central database. Such data sets comprise structured and unstructured data, prompted and volunteered data, and data in a variety of formats including but not limited to text, images, moving images, video and sound. Such data sets include but are not limited to the following content about the user and the potential match sought: characteristics, interests, description, and other data.

In one embodiment of the invention as a method, the method first provides for the accepting and then storing of the unique identifier of a mobile device and of fully customizable data set to be associated with the person transporting the mobile device and the data set(s) of other persons transporting mobile devices for which detection is sought. The method then provides for the detection of proximate mobile devices, a comparison and evaluation of the data sets associated with the persons transporting the proximate mobile devices and of the data set(s) for which detection is sought and notification when the data sets of the persons transporting the proximate mobile devices overlap.

In one embodiment of the invention as an apparatus a central database and data processing center connect to mobile devices with Bluetooth or a geo positioning platform and further augmented with software for communicating with the central database. The resulting apparatus comprises components for inputting data electronically; mobile devices coupled with the central database; and the central database which includes components for accepting electronic data input, storing electronic data, accepting notification of proximity from mobile devices, data analysis, and for communicating with mobile devices.

BRIEF DESCRIPTION OF THE DRAWINGS

The operation of this invention can best be visualized by reference to the following drawings described below.

DETAILED DESCRIPTION OF THE INVENTION

Figure 1:
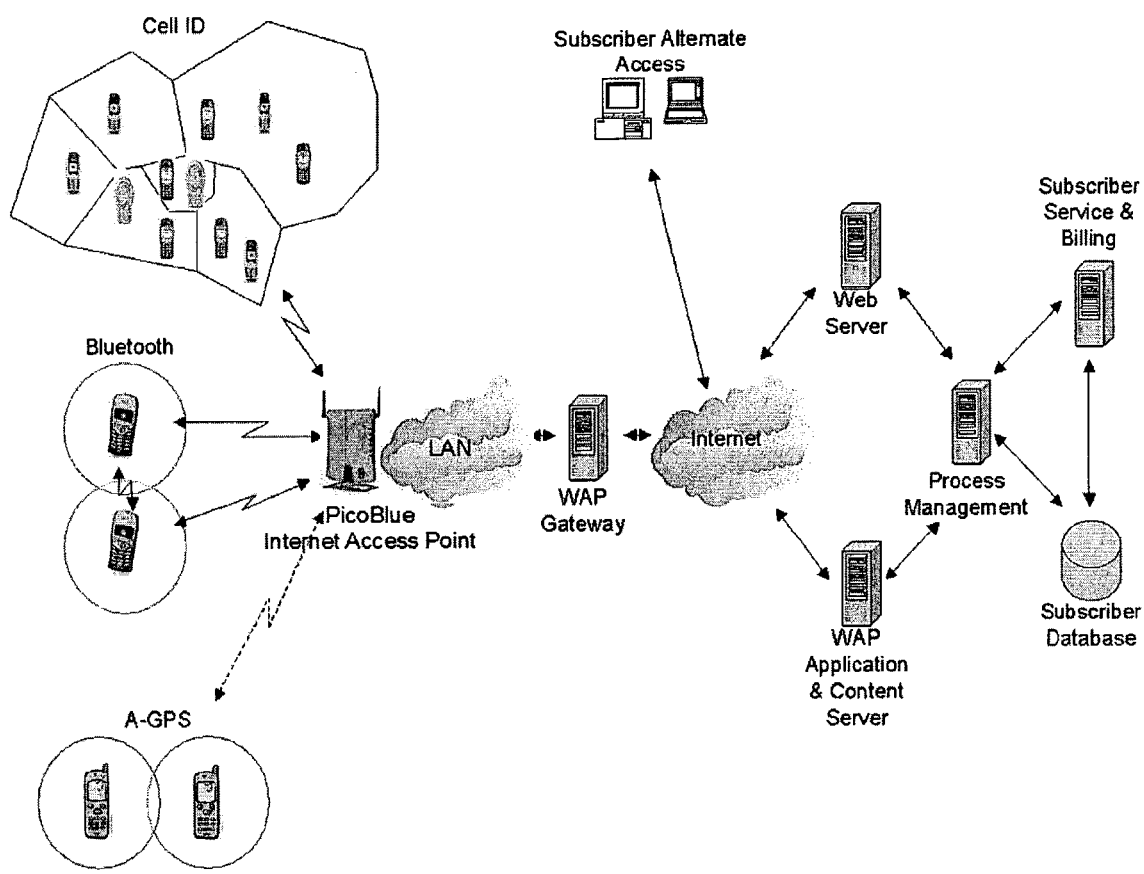
FIG. 1 illustrates an exemplary apparatus upon which the detection of selected proximate mobile devices may be practiced in accordance with an embodiment of the invention using private network.

Described in detail below is a method and apparatus for effecting the detection of selected proximate mobile devices, and the invention is particularly well adapted to mobile devices equipped with Bluetooth or a geo positioning platform with location specificity comparable to that encompassed within the Bluetooth piconet. In the following description, for purposes of explanation, numerous specific details are set forth in order to provide a thorough explanation of the present invention. It will be obvious, however, to one skilled in the art that the present invention may be practiced without these specific details. In other instances, well-known structures and devices are shown in block diagram form in order to avoid obscuring the present invention.

The invention disclosed is one embodiment of an apparatus that provides the useful, tangible result of detecting proximate mobile devices and notifying the persons transporting these devices if pre-determined data sets associated with those persons overlap. The apparatus incorporates components of mobile devices, adds additional software components to the mobile devices, incorporates either a private or public wireless network, and components of a central database with application software to effect this result.

In one embodiment of the invention as a method, and the best mode contemplated by the inventor, a fully customizable profile (data set) to be associated with the person transporting a mobile device and profile(s) of other persons transporting mobile devices for which detection is sought are accepted and stored in a separate central electronic database such as Oracle 8i. The persons can create, update, and maintain their profiles by downloading and invoking a Java applet in a browser on a computer connected to this database through a network. These profiles are identified by and associated with the globally unique 48-bit Bluetooth device address (BD_ADDR) identifier of the mobile device to be transported, which mobile device is Bluetooth-enabled. One such device is Nokia's 6310i mobile phone that is both Bluetooth and Java enabled. An applet written using Java APIs for Bluetooth Wireless Technology (JSR-82) is uploaded on Nokia 6310i mobile phone. This applet allows the person to alternatively create, update, and maintain their profile in the central database from this mobile phone. This applet also allows the person to start and stop the proximate mobile device detection; to select the interval and frequency of periodic detection of proximate mobile devices to conserve energy or increase the chances of detection of proximate mobile devices in a more dynamic environment; to select the Bluetooth radio signal strength and thereby to control the maximum distance at which the proximate mobile devices are detected resulting in closer or more distant detection of proximate mobile devices; to select the notification mode when proximate mobile devices are detected and a match is determined; to initiate the desired mode of communication with the detected mobile device and based on the information in the profile of the person transporting the detected mobile device.

When invoked, this applet effects period detection of proximate Bluetooth-enabled devices. Once a proximate Bluetooth-enabled device is detected, a piconet is established, which prompts the applet running on the detecting Bluetooth-enabled mobile device to initiate connection with the central database through a network access point such as PicoBlue's Internet Access Point. Once the applet has connected to the central database application, it passes on to the central database application the 48-bit Bluetooth device address (BD_ADDR) identifier of both the detecting and the detected mobile device.

Applications within the central database analyze whether the received 48-bit Bluetooth device addresses have profiles (data sets) associated with them and stored in the central database. If the received 48-bit Bluetooth device addresses have profiles (data sets) associated with them and stored in the central database, the central database applications further analyze these profiles and effect the notification, recordation, or communication between the persons transporting these mobile devices according to the joint effect of the rules in the said profiles.

With reference to FIG. 1, in one embodiment of the invention as an apparatus, Bluetooth and Java enabled mobile telephones, such as Nokia's 6310i mobile phone, with the software applet that invokes the detection of the proximate Bluetooth-enabled mobile devices and that initiates the connection to the network and the central database through a network access point such as PicoBlue's Internet Access Point, captures and passes the globally unique 48-bit Bluetooth device address ($BD_{13}ADDR$) identifier of the detecting and detected mobile device to the central database for analysis, processing, and response.

Figure 2:
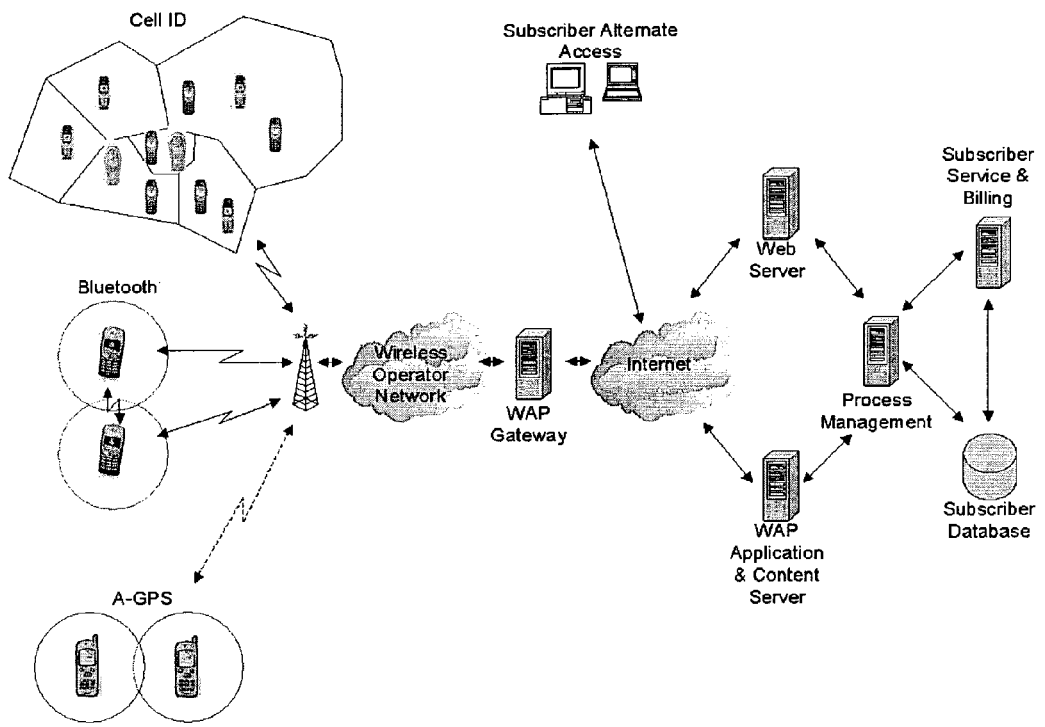
FIG. 2 illustrates another exemplary apparatus upon which the detection of selected proximate mobile devices may be practiced in accordance with an embodiment of the invention using public wireless carrier operated infrastructure.

Alternatively, with reference to FIG. 2, data is transmitted via any wireless carrier/operator infrastructure from the mobile telephones to the WAP Application & Content Server and from the WAP Application & Content Server to the mobile telephones. The Servers host the Database (data sets) and software for performing data set comparisons and evaluations.

Figure 3:
FIG. 3 is a diagram depicting a method for accepting and storing data sets in accordance with an embodiment of the invention.

With reference to FIG. 3, in another embodiment of the invention, data sets, mobile device identifier numbers, and any other data specific to the person to be transporting the mobile device are accepted via any computing device equipped with an Internet browser. The data sets, mobile identifier numbers and any other data specific to the person to be transporting the mobile device are stored electronically in a separate central database.

Figure 4:
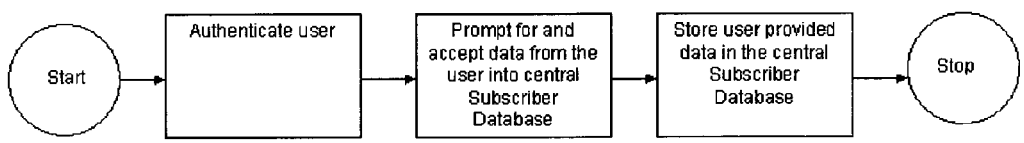
FIG. 4 is a diagram depicting a method for maintaining, updating and managing access to data sets in accordance with an embodiment of the invention.

With reference to FIG. 4, in another embodiment of the invention, the data sets and other stored information is constantly accessible with authentication for modification and control.

Figure 5:
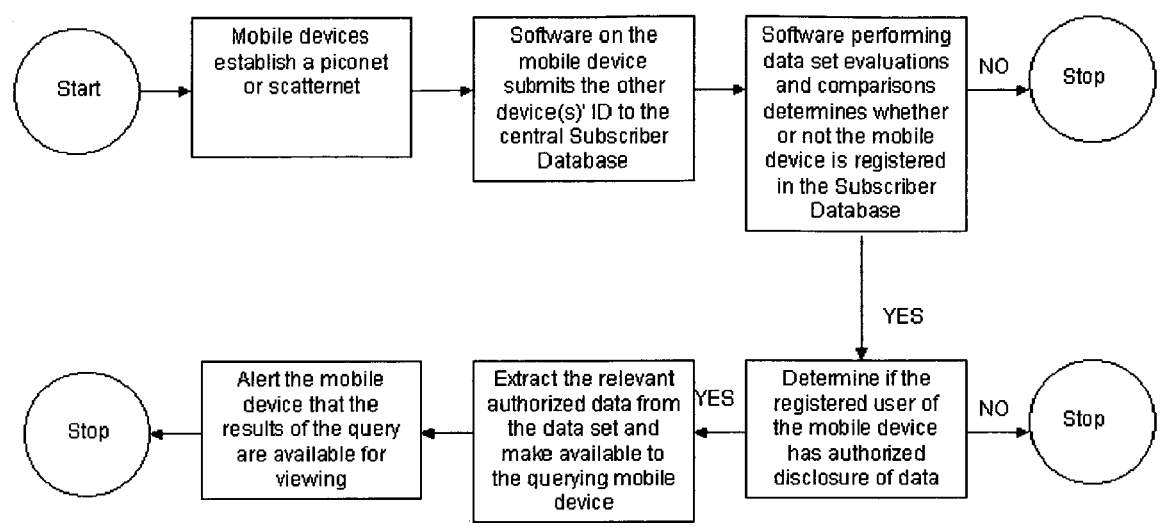
FIG. 5 is a diagram depicting a method for detecting proximate mobile devices as well as analyzing data sets for overlap in accordance with an embodiment of the invention.

With reference to FIG. 5, in another embodiment of the invention, when two or more mobile devices have established an ad hoc communication connection using Bluetooth, the devices communicate each other's unique identifiers, e.g., mobile devices' globally unique 48-bit Bluetooth Device Address (BD_ADDR) to the Database, and the software performs data set comparisons and evaluations to determine whether or not commonalities exists between the data sets of the persons transporting the mobile devices.

In another embodiment of the invention, the central database returns to the proximate mobile devices notification that commonalities exist between one or more persons transporting mobile devices within a sphere of approximately 10 meters.

What is claimed is:

1. A method for detecting selected proximate mobile devices comprising the steps of:
    a) accepting the unique identifier of a mobile device, the profile to be associated with the person transporting this mobile device and the profile(s) of other persons transporting mobile devices for which detection is sought;
    b) storing the unique identifier and the profiles in a separate central database;
    c) detecting proximate mobile devices by periodically initiating detection of proximate Bluetooth-enabled devices; establishing Bluetooth piconets with such proximate Bluetooth-enabled devices that are within range; obtaining such proximate mobile devices' globally unique 48-bit Bluetooth devices address (BD ADDR); and initiating connection to the central database application through a local network access point or through a commercial wireless carrier/operator infrastructure;
    d) submitting to the separate central database application the unique identifiers of the detected and detecting mobile devices;
    e) determining whether or not such unique identifiers have profiles stored in the central database;
    f) comparing and evaluating the profiles associated with the persons transporting the proximate mobile devices to determine whether the data comprising the profiles matches when profiles are available for both detecting and detected mobile devices;
    g) notifying the person(s) transporting mobile devices that a proximate match based on their profile is detected;
    h) effecting an exchange of information between proximate mobile devices when the comparison and evaluation of the profiles determines that there is a match.

2. A device for detecting selected proximate mobile devices comprising:
    a) a component for inputting data electronically;
    b) a component for accepting electronic data input;
    c) data storage component coupled to said component for accepting electronic data input;
    d) a component for mobile devices automatically to initiate regular and periodic detection of proximate mobile devices consisting of software running on the mobile device that allows the user to start and stop the detection of proximate Bluetooth-enabled devices; to select the interval and frequency of periodic detection of proximate mobile devices to conserve energy or increase the chances of detection of proximate mobile devices in a more dynamic environment; to select the Bluetooth radio signal strength and thereby to control the maximum distance at which the proximate devices are detected resulting in closer or more distant detection proximate devices; to select the notification mode when proximate mobile devices are detected and a match is determined; to initiate the desired mode of communication with the detected mobile device and based on the information in the profile of the person transporting the detected mobile device;
    e) a component for submitting to the central database application the unique identifiers of the detected and detecting mobile devices;
    f) data analysis component; and
    g) component for communicating detection of proximity to mobile devices.

* * * * *